United States Patent
Hijzen et al.

(10) Patent No.: US 8,450,823 B2
(45) Date of Patent: May 28, 2013

(54) INTEGRATED CIRCUIT WITH GRATING AND MANUFACTURING METHOD THEREFOR

(75) Inventors: Erwin Hijzen, Haasrode (BE); Magali Lambert, Orsay (FR)

(73) Assignee: NXP B.V., Eindhoven (NL)

( * ) Notice: Subject to any disclaimer, the term of this patent is extended or adjusted under 35 U.S.C. 154(b) by 13 days.

(21) Appl. No.: 13/119,370

(22) PCT Filed: Sep. 12, 2009

(86) PCT No.: PCT/IB2009/053994
§ 371 (c)(1),
(2), (4) Date: Mar. 16, 2011

(87) PCT Pub. No.: WO2010/032187
PCT Pub. Date: Mar. 25, 2010

(65) Prior Publication Data
US 2011/0169120 A1  Jul. 14, 2011

(30) Foreign Application Priority Data

Sep. 16, 2008 (EP) .................................... 08105358

(51) Int. Cl.
*H01L 31/0232* (2006.01)
*H01L 21/00* (2006.01)

(52) U.S. Cl.
USPC ............ 257/432; 257/E31.127; 257/E31.002; 438/69

(58) Field of Classification Search
USPC .......... 257/432, 431, 428, 414, 440, E31.002, 257/E31.127; 438/69, 57, 48, 72
See application file for complete search history.

(56) References Cited

U.S. PATENT DOCUMENTS

| | | | |
|---|---|---|---|
| 5,020,910 A | 6/1991 | Dunn et al. | |
| 5,731,874 A | 3/1998 | Maluf | |
| 5,909,280 A | 6/1999 | Zavracky | |
| 6,249,346 B1 | 6/2001 | Chen et al. | |
| 6,452,675 B1 | 9/2002 | Muller et al. | |
| 7,084,974 B1 | 8/2006 | Barwicz et al. | |
| 2003/0086649 A1* | 5/2003 | Zhou | 385/37 |
| 2006/0209413 A1 | 9/2006 | Kim et al. | |
| 2007/0146376 A1* | 6/2007 | Miles | 345/540 |
| 2008/0202209 A1* | 8/2008 | Lambkin et al. | 73/31.05 |

OTHER PUBLICATIONS

Sander, Dietmar, et al., "Microspectrometer With Slab-Waveguide Transmission Gratings"; Applied Optics, OSA, Optical Society of America, Washington, DC, US; vol. 35, No. 21; pp. 4096-4101 (Jul. 1996).

(Continued)

*Primary Examiner* — Olik Chaudhuri
*Assistant Examiner* — Wilner Jean Baptiste

(57) ABSTRACT

Disclosed is an integrated circuit (100) comprising a substrate (110) carrying a plurality of light-sensitive elements (112) and a blazed grating (120) comprising a plurality of diffractive elements (122) for diffracting respective spectral components (123-125) of incident light (150) to respective light-sensitive elements (112), the blazed grating (120) comprising a stack of layers, at least some of these layers comprising first portions, e.g. metal portions (202, 222, 242) arranged such that each diffractive element (122) comprises a stepped profile of stacked first portions with a first portion in a higher layer laterally extending beyond a first portion in a lower layer of said stepped profile.

19 Claims, 5 Drawing Sheets

OTHER PUBLICATIONS

Correia, J.H., et al; "A CMOS Optical Microspectrometer With Light-to-Frequency Converter, Bus Interface, and Stray-Light Compensation" IEEE Transactions on Instrumentation and Measurement, vol. 50, No. 6; pp. 1530-1537 (Dec. 2001).

Catrysse, P.B., etal; "Integrated Color Pixels in 0.18 µm Complementary Metal Oxide Semiconductor Technology" J. Opt. Soc. Am. A. vol. 20, No. 12; pp. 2293-2306 (2003.

Wolffenbuttel, R.F.; "State-of-the-Art in Integrated Optical Microspectrometers"; IEEE Transactions on Instrumentation and Measurement, vol. 53; pp. 197-202 (2004).

Meijer, E.J.; "PR-TN 2006/00215—Mini Spec—Integrated Spectral Detectors Benchmark Study"; Philips Research Europe; 51 pages (Mar. 2006).

Yang, F., et al; "Integrated Colour Detectors in 0.18 µm SMOS Technology" Electronics Letters, vol. 43; 2 pages (Nov. 2007).

International Search Report and Written Opinion for Application PCT/IB2009/053994 (Dec. 15, 2009).

* cited by examiner

INTEGRATED CIRCUIT WITH GRATING AND MANUFACTURING METHOD THEREFOR

The present invention relates to an integrated circuit comprising a substrate carrying a plurality of light-sensitive elements and a grating comprising a plurality of diffractive elements for guiding respective spectral components of incident light to respective light-sensitive elements.

The present invention further relates to a method of manufacturing such an integrated circuit.

Photo-sensitive integrated circuits (ICs) are well-known. Such ICs for instance find applications as photo-sensors in electronic devices such as digital cameras, mobile phones having camera functionality and so on. Other applications include spectrophotometers. Many other examples are available.

In order to analyze, e.g. quantify, different spectral components of incident light, the incident light has to be separated into these components and projected onto different light-sensitive elements. This may for instance be achieved by color filters. However, the use of color filters has the drawback that additional components have to be added to the integrated circuit, which may require additional processing steps that are not necessarily compatible with the manufacturing process steps of the IC itself. Alternatively, separate color filters may be provided, but this adds cost to the end product and may introduce other problems, e.g. placement and alignment problems.

Due to the large volume of complementary metal-oxide on silicon (CMOS) ICs on the market, there has been a growing interest in providing solutions that allow for the separation of the spectral components of incident light and that can be readily integrated in a CMOS IC manufacturing process. For example, U.S. Pat. No. 5,020,910 discloses a monolithic diffraction spectrometer in which a diffraction grating formed over a light sensing array is provided. The diffraction grating is formed in the metal layers of the IC and has a variable pitch such that a large number of specific wavelengths can be projected onto different parts of the light sensing array. Improved sensitivity is achieved when the pitch dimensions are chosen in the order of the wavelength of the incident light.

F. Yang et al. in Electronics Letters, Vol. 43, pages 1279-1281, 2007, disclose an integrated colour detector in CMOS 0.18 micron technology, in which a diffractive grating is included in a CMOS IC in the form of a metal grid in the metal layer closest to the silicon substrate.

P. B. Catrysse et al. in J. Opt. Soc. Am. A, Vol. 20, No. 12, pages 2293-2306, 2003, disclose an IC in 0.18 micron CMOS technology in which patterned metal layers are placed over a pixel photodetector in the substrate of the IC. The patterned metal layers act as a colour filter. In an embodiment, the colour filter is composed of a stack of metal layers, with the periodicity between the layers being a multiple of the periodicity within each layer.

A drawback of these diffractive grating-based solutions in the metal layers of a CMOS IC is that the bulk of the light passes these gratings in the zero$^{th}$ order, i.e. undiffracted. Consequently, the limited intensity of the higher order diffractions, in which the spectral components are separated, can prohibit the accurate determination of the intensity of these spectral components.

The present invention seeks to provide an integrated circuit comprising a substrate carrying a plurality of light-sensitive elements and a grating comprising a plurality of diffractive elements for guiding respective spectral components of a spectrum of incident light to respective light sensitive elements in which the intensity of these spectral components is improved.

The present invention further seeks to provide a method of manufacturing such an integrated circuit.

According to an aspect of the present invention, there is provided an integrated circuit comprising a substrate carrying a plurality of light-sensitive elements and a blazed grating comprising a plurality of diffractive elements for diffracting respective spectral components of incident light to respective light sensitive elements, the blazed grating comprising a stack of layers at least some of these layers comprising an alternating pattern of first portions having a first refractive index and further portions having a further refractive index, the first portions being arranged such that each diffractive element comprises a stepped profile of stacked first portions with a first portion in a higher layer laterally extending beyond a first portion in a lower layer of said stepped profile.

The approximation of a saw tooth pitch diffractive element of a blazed grating by means of a transparent material bordered by the stepped profile of the metal portions ensures that a substantial portion of the incident light travels through the grating in a non-zero order, thus ensuring that a substantial portion of the incident light is spectrally separated.

In an embodiment, the first portions are metal portions. This has the advantage that the blazed grating can be easily realized using existing backend processing techniques.

Preferably, the upper layer of each diffractive element comprises an upper first portion having a first width and an upper further portion between the upper first portion and an upper first portion of a neighboring diffractive element, said upper further portion having a second width, the upper layer width being the sum of the first width and the second width, wherein the ratio between the second width and the upper layer width does not exceed 0.5. This ensures that the bulk of the incident light is transmitted in the $1^{st}$ order.

In a preferred embodiment, said ratio is 1/3, at which ratio the first order transmission is optimized.

Advantageously, the integrated circuit further comprising a light guide optically coupled between the blazed grating and the plurality of light-sensitive elements, the light guide comprising at least partially transparent medium, a first metal portion on an upper surface of the at least partially transparent medium and a second metal portion on a lower surface of the at least partially transparent medium, the first metal portion being laterally displaced with respect to the second metal portion. Such a light guide extends the light path of the incident light, which means that the reflections of the spectral components between the two metal portions acting as opposite mirrors increases the spatial separation of the spectral components upon reaching the light-sensitive elements, thereby facilitating an improved accuracy in the detection of the intensity of each spectral component by the reduction of colour crosstalk.

A further advantage is achieved when the plurality of light-sensitive elements are arranged in a two-dimensional grid on the substrate, wherein the photo-sensitive elements in the direction parallel to the diffraction patterns generated by the blazed grating are arranged in a staggered orientation. This ensures that the effective pitch of the light-sensitive elements is reduced, thus improving the spectral resolution of the integrated circuit.

The integrated circuit of the present invention may be integrated in an electronic device, e.g. as a photo-sensor. Such an electronic device may be a device for capturing digital images, e.g. a digital camera, mobile phone with such a camera and so on.

According to a further aspect of the present invention, there is provided a method of manufacturing an integrated circuit, comprising providing a substrate carrying a plurality of light sensitive elements; forming a first layer over the substrate, said first layer comprising an alternating pattern of first portions having a first refractive index and further portions having a further refractive index;

forming a further layer over the first layer, said further layer comprising a further alternating pattern of said first portions and further portions, wherein a first portion in the further layer laterally extends beyond a first portion in the first layer, said first portion and further first portion forming a stepped profile of a diffractive element of a blazed grating.

Embodiments of the invention are described in more detail and by way of non-limiting examples with reference to the accompanying drawings, wherein FIG. 1 schematically depicts an embodiment of an IC of the present invention;

FIG. 2 schematically depicts an aspect of the embodiment of FIG. 1 in more detail;

FIG. 3 schematically depicts an aspect of an alternative embodiment of an IC of the present invention;

FIG. 4 schematically depicts an aspect of another alternative embodiment of an IC of the present invention;

Figure 9:
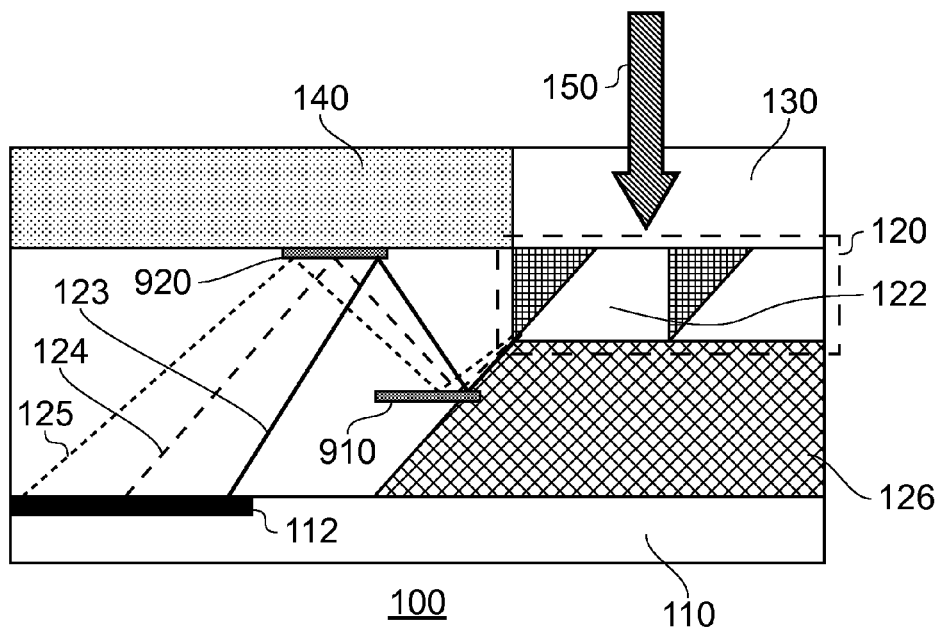
Figure 10:
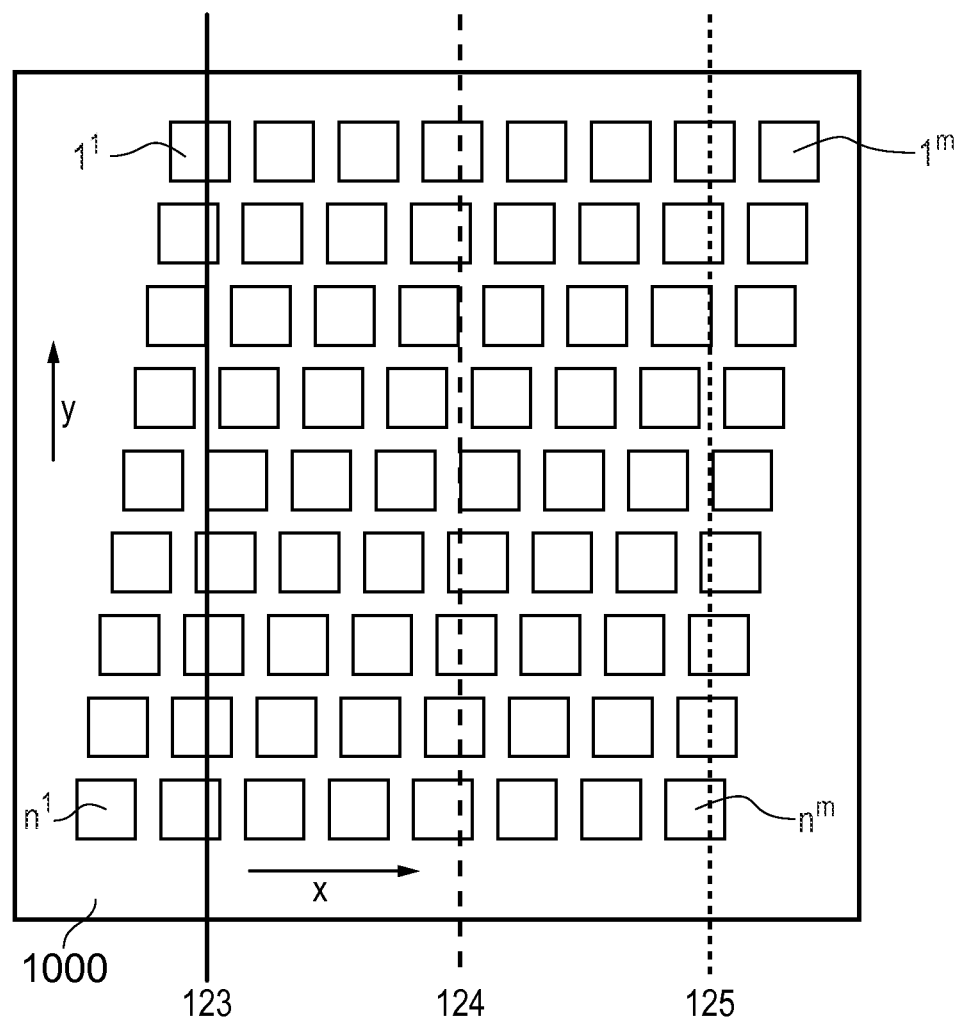

FIG. 9 schematically depicts a further embodiment of an IC of the present invention; and FIG. 10 schematically depicts an aspect of a yet further embodiment of an IC of the present invention in more detail.

DETAILED DESCRIPTION OF THE DRAWINGS

It should be understood that the Figures are merely schematic and are not drawn to scale. It should also be understood that the same reference numerals are used throughout the Figures to indicate the same or similar parts.

Figure 1:
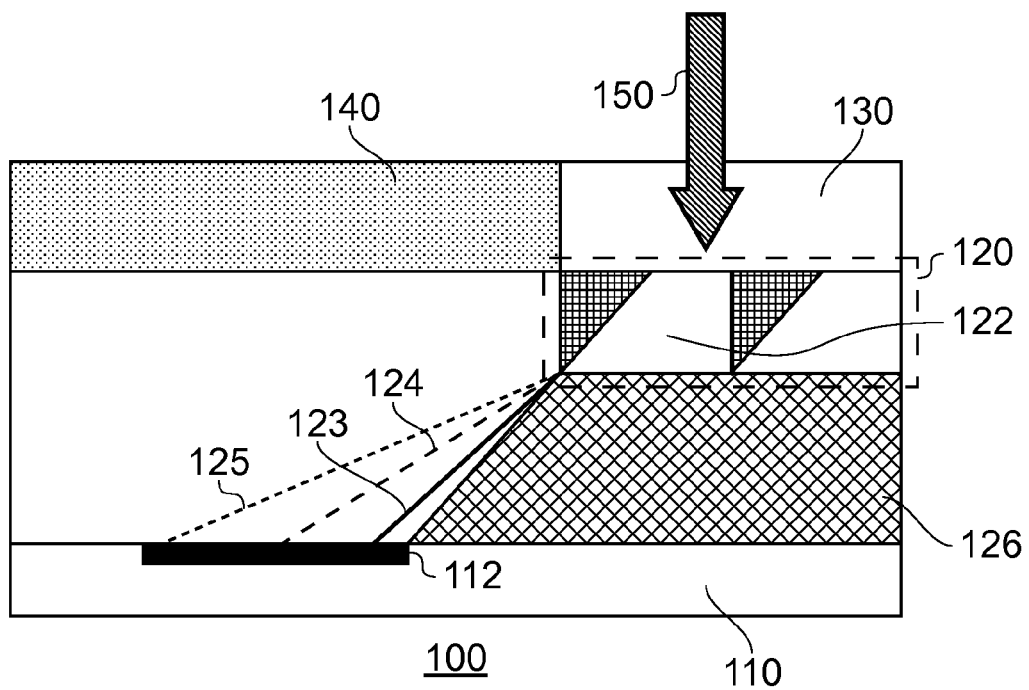

FIG. 1 depicts an embodiment of an IC 100 of the present invention. The IC 100 comprises a substrate 110, which may be any suitable substrate such as a silicon substrate, a silicon-on-insulator substrate and so on. The substrate 110 carries a plurality of photo-sensitive elements 112, e.g. photodiodes or other elements capable of converting incident light into an electric current. In an embodiment, the photo-sensitive elements 112 are $n^{++}$ source/drain to p-junction photodiodes, which can be readily formed in a standard front-end CMOS process. The backend CMOS process is typically used to form the metal layers that interconnect the various semiconductor devices on the substrate 110 such as the photodiodes 112, either to other semiconductor elements and/or to external contacts, e.g. bond pads. To this end, a stack of layers comprising such metallic interconnects is typically formed. For instance, in a CMOS 9 micron process, a stack of up to nine or even more metal layers may be routinely formed.

In accordance with the present invention, at least some of the metal interconnect layers of the IC 100 are patterned to form a blazed grating 120 having diffractive elements 122. The preferred shape of the diffractive elements 122 will be explained in more detail later. The diffractive elements 122 diffract incident light 150 such that non-zero orders of the diffracted incident light 150 occur as separated spectral components, e.g. components 123-125 as shown in FIG. 1.

The IC 100 of the present invention is designed to detect these non-zero order spectral components 123-125. To this end, the light-sensitive elements 112 are laterally displaced with respect to one of the diffractive elements 122, i.e. the diffractive element responsible for generating the spectral components 123-125 of interest. The zero$^{th}$ order of the incident light 150 will pass through this diffractive element 122 undiffracted, i.e. without alteration of the angle of incidence. For this reason, no photo-sensitive elements 112 are present in region 126, because such elements would detect the spectrally unresolved zero$^{th}$ diffraction order of the incident light 150, which cannot be used to obtain useful information about the spectral composition of the incident light 150.

Although the blazed diffraction grating 120 is shown to have contiguous diffraction elements 122, it will be understood that this is by way of non-limiting example only. For instance, the diffraction elements 122 of the blazed diffraction grating 120 that would generate higher order diffractions in the region 126 may be replaced by an opaque material, e.g. one or more metal layers, such that an alternating pattern of diffraction elements 122 and opaque portions is obtained. Correspondingly, it will be understood that the substrate 110 may carry spaced clusters of photo-sensitive elements 112 corresponding to the alternating pattern of diffractive elements 122 and opaque regions (not shown) in the diffractive grating 120.

Optionally, the metal stack of the IC 100 may be covered by a material 130 over the diffractive grating 120 that is at least partially transparent to the incident light 150 and an opaque material 140 for protecting the plurality of light-sensitive elements 112 from incident light other than the incident light 150 diffracted by the blazed diffraction grating 120.

It will be obvious that the materials used in the manufacturing of the IC 100 in the light path of the incident light 150 to the plurality of light-sensitive elements 112 should be sufficiently transparent to the spectral components of interest in the incident light 150. For instance, it was demonstrated that the use of silicon oxide ($SiO_2$) as the transparent material ensured that for a metal stack of nine metal layers, sufficient amounts of visible light, i.e. light in a wavelength bandwidth from 350-750 nm were able to reach the plurality of light-sensitive elements 112. Other suitable materials, e.g. other types of oxides, may also be contemplated.

Figure 2:
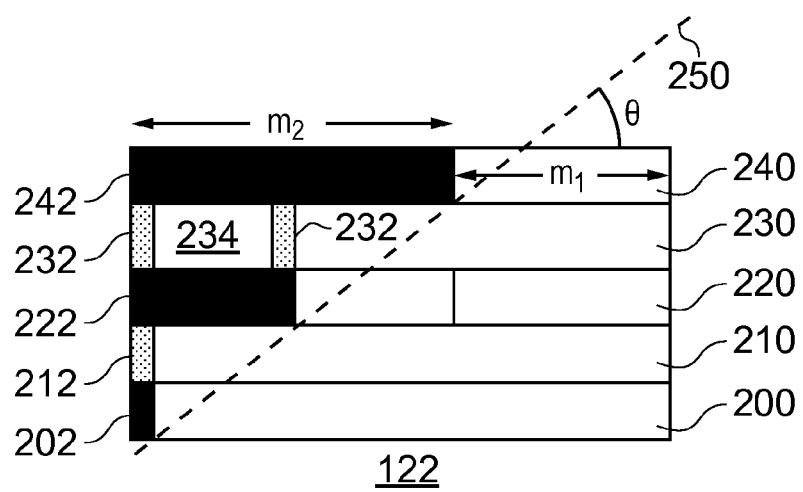

As is well-known in the field of optics, an ideal blazed grating comprises saw tooth-shaped diffractive elements. In an embodiment, the diffractive elements 122 in the IC 100 of the present invention comprise a stepped, i.e. a staircase, profile to approximate this saw tooth shape. FIG. 2 gives an example of such a diffractive element 122. Here, the diffractive element 122 is realized in three CMOS backend metal layers; a first layer 200 comprising a first metal portion 202, a second layer 220 comprising a second metal portion 222 laterally extending over the first metal portion 202 and a third metal layer 240 having a third metal portion 242 laterally extending over the second metal portion 222, thus forming a stepped profile that widens in the direction away from the substrate 110.

The metal layers may be separated by intermediate layers 210, 230, in which one or more vias are placed to interconnect the different metal portions. For instance, the intermediate layer 210 may comprise a via 222 for connecting the first metal portion 202 to the second metal portion 222 and the intermediate layer 230 may comprise further vias 232 for connecting the second metal portion 222 to the third metal portion 242. The vias 232 may be separated by any suitable material 234, e.g. $SiO_2$. The vias are preferably of an opaque material to avoid the occurrence of stray light paths by the reflection of light between opposite metal portions, e.g. second metal portion 222 and third metal portion 242. For instance, the vias may also be metal portions.

The metal layers 200, 220 and 240 may be any of the layers of the stack of metal layers of the IC 100; e.g. the uppermost three layers, three intermediate layers, the lowest three metal layers and so on. The metal layers 200, 220 and 240 may have the same or different thicknesses. The same applies to the intermediate layers 210 and 230. It is further pointed out that although the presence of intermediate layers such as layers 210 and 230 is preferable because they comply with standard CMOS backend processing techniques, their presence is not essential for the present invention.

It will be appreciated that the metal layers of the IC 100 may be formed in any suitable way. For instance, in case of the metal portions comprising copper portions, each layer may be formed by the deposition of an insulating material such as $SiO_2$, masking and patterning the layer of the insulating material to form a trench in which the copper portion may be deposited. Such a technique is commonly known as a Damascene process. Other metals, e.g. Aluminum, may also be considered. Aluminum may for instance be deposited using layer deposition techniques, e.g. physical layer deposition, after which the formed layer may be patterned to form the metal portions of the metal layers, followed by the deposition of the insulating material, e.g. $SiO_2$, surrounding the metal portions in the layer. The formation of metal layers in an IC manufacturing process such as a backend CMOS process is common general knowledge for the skilled person and will therefore not be discussed in further detail. It will be appreciated that the patterning and/or deposition steps of these manufacturing methods may be preceded by the deposition and patterning of masking layers, which may be removed after completion of the patterning process or after selective metal deposition, and that excess materials, e.g. excess metal deposits may be removed using any suitable technique, e.g. chemical-mechanical polishing. Many variations will be apparent to the skilled person.

Figure 3:
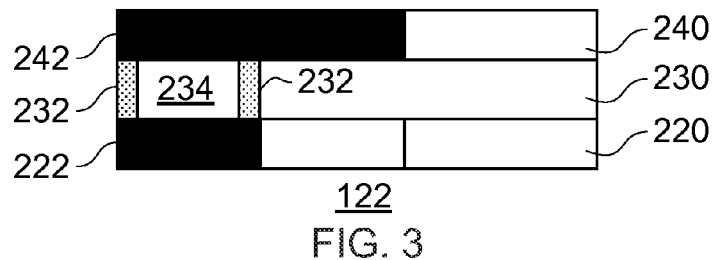
Figure 4:
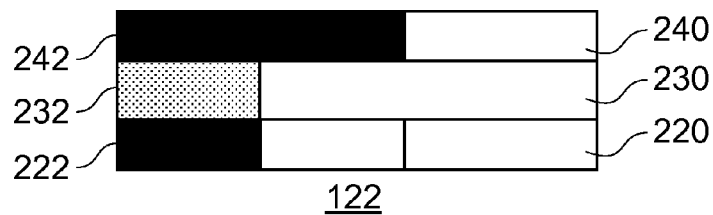

It should be understood that the approximated saw tooth-shape diffraction element 122 shown in FIG. 2 is shown by way of non-limiting example only and that many variations, depending on the requirements of the diffractive properties of the diffractive element 122 may be considered. For instance, the number of metal layers in the diffractive element 122 may be different to three metal layers. In FIG. 3, a diffractive element 122 comprising only two metal layers, i.e. layers 220 and 240, is shown, such that the saw tooth is approximated by second metal portion 222 and third metal portion 242 only. In FIG. 4, the diffractive element of FIG. 3 is amended such that the two vias 232 separated by the material 234 in the intermediate layer 230 are replaced by a single via 232 extending over the full width of the second metal portion 222. Many other variations may be considered; for instance, any number of metal layers may be included in the stepped profile of the diffractive element 122, the vias may be tapered to match the angle θ of the stepped profile and so on.

Moreover, it should be understood that although the use of metal portions to form the stepped profile of the blazed grating 120 is advantageous because it can be readily implemented in the backend of a CMOS manufacturing process, the invention is not limited to the use of metal portions. In fact, any suitable opaque material may be used to realize the stepped profile of the blazed grating 120. Such stepped profiles may also be realized using known manufacturing techniques, e.g. by filling patterned layers of a transparent dielectric material such as $SiO_2$ with such opaque portions, which may be deposited in any suitable manner, or by patterning a deposited layer of opaque material, covering the patterned layer with the transparent dielectric material and planarizing the thus formed composite layer, i.e. a layer having an alternating pattern of portions of materials having different optical properties, e.g. different refractive indices and/or different extinction coefficients for the incident light. Alternative manufacturing methods will be apparent to the skilled person.

Upon returning to FIG. 2, it is emphasized that the diffractive properties of the diffractive grating 120 depend on the dimensions chosen for the various parts of the diffractive elements 122. The diameter or pitch P of a diffractive element 122 is defined as $P=m_1+m_2$, in which $m_2$ is the width of the upper metal portion of the diffractive element 122, e.g. third metal portion 242 in FIG. 2, and $m_1$ is the width of the upper transparent portion of the diffraction element 122, e.g. portion 240 in FIG. 2. The tangent 250 defines the angle θ of the stepped profile with the surface of the diffractive element 122. The angle θ may be varied by changing the width ratios of the metal portions in the stepped profile of the diffractive elements 122.

The pitch P is typically chosen to have a dimension in the order of the spectral width of the incident light 150. For instance, for incident light 150 having a wavelength from 350-750 nm, it has been found that a pitch P around 800-1000 nm provides the highest yield of spectral components 123-125 reaching the plurality of photo-sensitive elements 112. The ratio $m_1/P$ affects how much light is diffracted by a diffractive element 122 in a non-zero$^{th}$ order. It has been found that for a diffractive grating 120 having diffractive elements 122 with stepped profiles, the majority of incident light 150 is diffracted in a non-zero$^{th}$ order if the ratio of $m_1/P$ does not exceed 0.5. The yield of the first order diffracted light is optimized when this ratio is 1/3.

These findings are demonstrated in the following tables, which give the simulation results for a diffraction element 122 comprising two metal portions stacked on top of each other, i.e. without the presence of a via-comprising intermediate layer. The thickness of the metal portions was chosen to be 620 nm.

TABLE I

| Grating parameters | | | Efficiencies in 1$^{st}$ diffracted order | | |
|---|---|---|---|---|---|
| P (nm) | $m_1/P$ | θ (°) | 450 nm | 550 nm | 650 nm |
| 900 | 1/3 | 54.03 | 7.66 | 8.16 | 15.35 |
| 900 | 1/3 | 57.17 | 7.70 | 7.59 | 14.99 |
| 900 | 1/3 | 64.18 | 6.78 | 5.94 | 12.1 |
| 900 | 1/3 | 72.12 | 5.37 | 4.83 | 10.5 |
| 900 | 1/3 | 76.4 | 4.49 | 3.26 | 8.46 |

Table I depicts the efficiencies of selected spectral components of unpolarized incident light 150, i.e. λ=450 nm, 550 nm and 650 nm respectively, under a perpendicular incident angle with the upper surface of the IC 100 as a function of the slope angle θ. The efficiencies are represented as the percentage of the first order diffracted incident spectral component of interest reaching the plurality of photo-sensitive elements 112. The slope angle θ may be modified by changing the dimensions of the metal portions of the stepped profile of a diffractive element 122, e.g. the width ratio between a higher and lower metal portion. From the above simulations, it can be derived that a slope angle θ in the range of 50-65° provides a good yield of the first order diffracted incident light for a $m_1/P$ ratio of 1/3.

It should be understood that the optimal angle θ is specific to the chosen ratio of $m_1/P$. This is for instance demonstrated in Table II, which depicts the efficiencies of selected spectral components of unpolarized incident light 150, i.e. λ=450 nm, 550 nm and 650 nm respectively, under a perpendicular incident angle with the upper surface of the IC 100 as a function of the slope angle θ for a $m_1/P$ ratio of 0.5.

TABLE II

| Grating parameters | | | Efficiencies in $1^{st}$ diffracted order | | |
|---|---|---|---|---|---|
| P (nm) | $m_1/P$ | θ (°) | 450 nm | 550 nm | 650 nm |
| 900 | 1/2 | 61.4 | 10.63 | 9.93 | 17.8 |
| 900 | 1/2 | 64.18 | 10.1 | 9.3 | 17.3 |
| 900 | 1/2 | 70.05 | 9.52 | 8.46 | 15.2 |
| 900 | 1/2 | 76.4 | 7.6 | 8.02 | 12 |
| 900 | 1/2 | 79.04 | 7.09 | 7.33 | 10.5 |

Here, the optimal angle θ was determined to be 61.4°.

TABLE III

| Grating parameters | | | Efficiencies in $1^{st}$ diffracted order | | |
|---|---|---|---|---|---|
| P (nm) | $m_1/P$ | θ (°) | 450 nm | 550 nm | 650 nm |
| 850 | 1/3 | 54.03 | 7.75 | 8.15 | 15.47 |
| 900 | 1/3 | 54.03 | 7.66 | 8.16 | 15.3 |
| 950 | 1/3 | 54.03 | 7.37 | 8.19 | 14.4 |
| 1000 | 1/3 | 54.03 | 7.08 | 8.14 | 14.4 |
| 1500 | 1/3 | 54.03 | 6.59 | 6.21 | 12.5 |

Table III depicts the effect of the pitch size P on the efficiency of the first order diffracted incident spectral component of interest reaching the plurality of photo-sensitive elements 112. It can be seen that this efficiency gradually decreases with an increasing pitch size. From this, it can be established that the pitch size should be chosen close to the upper wavelength limit of the spectral composition of the incident light 150 of interest. For visible light, i.e. light having a spectral composition of 350-750 nm, a pitch in the range of 850-1000 nm is preferable although deviations from this range are possible at the sacrifice of a reduction in the aforementioned efficiency.

It was further found that for a ratio $m_1/P$ having a value of 1/2 or less, most incident light 150 was diffracted in the first order. However, it is pointed out that higher values of this ratio are equally feasible; although more incident light passes through the grating 120 undiffracted, i.e. in the zero$^{th}$ order, the efficiencies of the first order diffracted spectral components may actually improve at these higher ratio values, dependent on the various dimensions of the components of the blazed grating 120.

Figure 5:
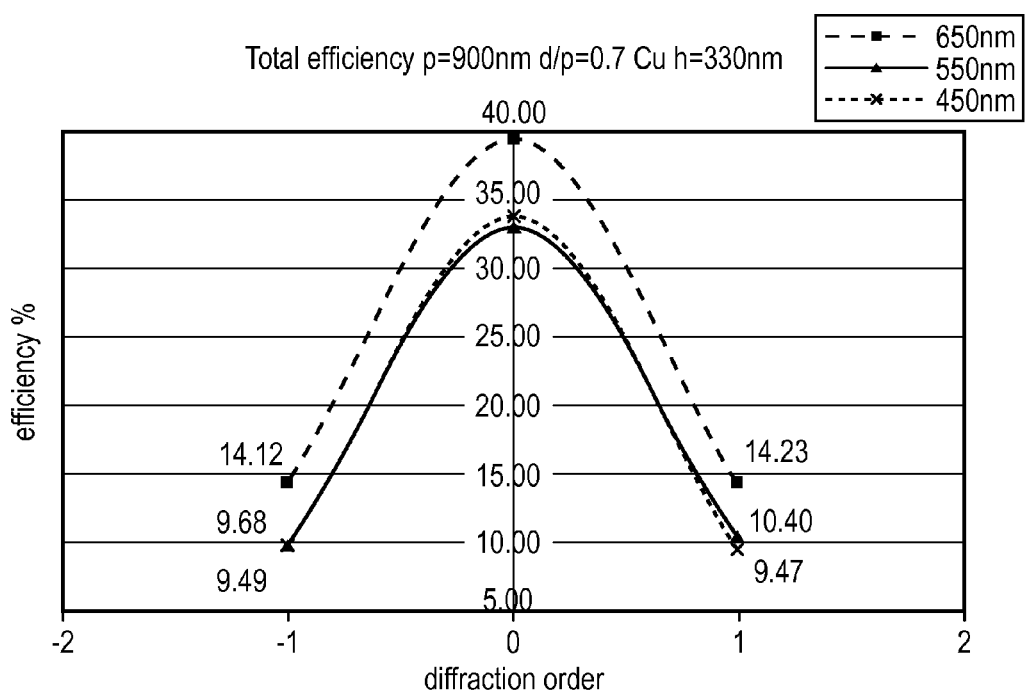
FIG. 5 shows a distribution of the transmittance of incident light as a function of the transmission orders for a diffractive grating of a prior art IC.
Figure 6:
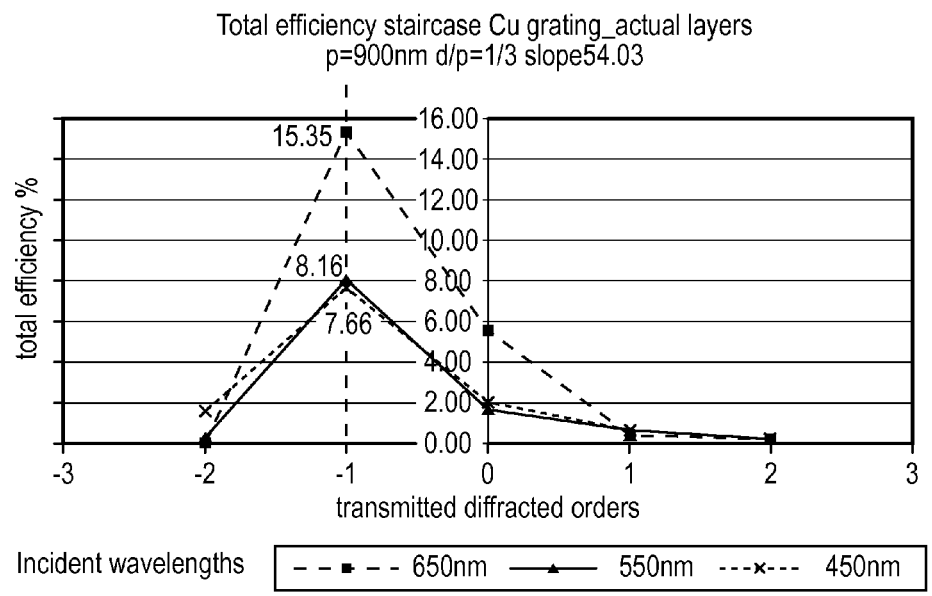
FIG. 6 shows a distribution of the transmittance of incident light as a function of the transmission orders for a diffractive blazed grating of an IC in accordance with an embodiment of the present invention.

FIG. 5 and FIG. 6 provide a comparison of the efficiencies of a prior art flat grating in an IC (FIG. 5) and a blazed grating (FIG. 6) according to an embodiment of the present invention. As can be seen from FIG. 5, the incident light 150 predominantly passes the known grating in the zero$^{th}$ order, i.e. undiffracted. In contrast, a blazed grating 120 having a $m_1/P$ ratio of 1/3 and θ=54.03°, has the highest efficiency in the $1^{st}$ diffraction order.

Figure 7:
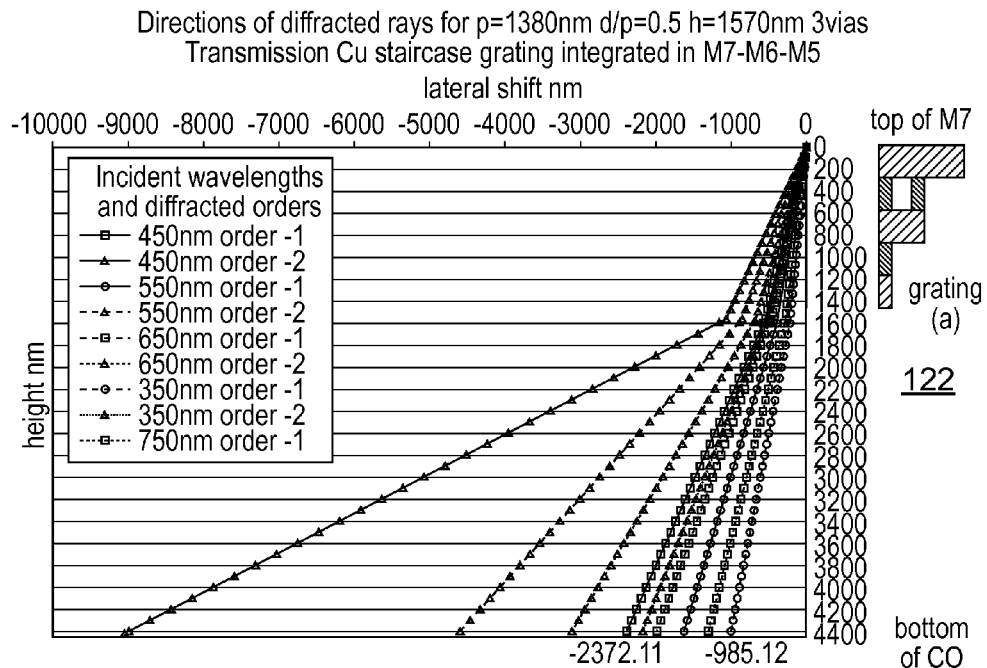
FIG. 7 shows the diffraction angles of various non-zero$^{th}$ order spectral components of incident light diffracted by a diffractive blazed grating of an IC in accordance with an embodiment of the present invention.

FIG. 7 depicts the directions of selected diffracted spectral components of the incident light 150 through a grating element 122 of FIG. 2, with P=1380 nm, $m_1/P$=1/2, θ=42.1° and an overall height of 1570 nm. As can be seen, the first and second order diffracted spectral components are significantly spatially separated when reaching the plurality of photo-sensitive elements 112 (bottom of the graph of FIG. 6) to facilitate the detection of different spectral components of the incident light 150 with the photo-sensitive elements 112.

Figure 8:
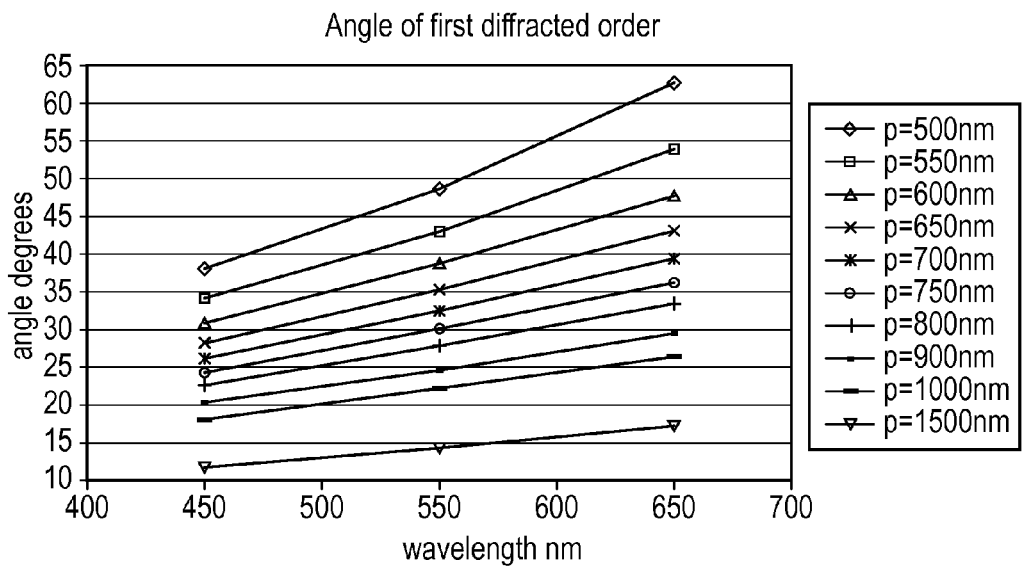
FIG. 8 shows the dependency of the diffraction angle of the first order diffracted spectral components of incident light as a function of the pitch of the diffractive elements of a diffractive blazed grating of an IC in accordance with an embodiment of the present invention.

The non-zero$^{th}$ order diffraction angles of the various spectral components of interest of the incident light 150 may be controlled by the dimension of the pitch P. This is demonstrated in FIG. 8, which depicts the diffraction angles of three components, λ=450 nm, 550 nm and 650 nm respectively for a pitch P ranging from 500 nm to 1500 nm. It can be seen that a reduction of pitch size may be used to increase the non-zero$^{th}$ order diffraction angles of the spectral components of the incident light 150 to improve the spectral resolution of the plurality of photo-sensitive elements 112 due to the fact that the spectral width of light falling on each of such an element 112 is reduced when the diffraction angle of the spectral components is increased.

The spatial separation of the spectral components of interest at the plurality of photo-sensitive elements 112 is a function of the aforementioned diffraction angle and the optical path length of the spectral component from the diffraction element 122 to the relevant photo-sensitive element(s) 112: an increase in the optical path length would typically increase the spatial separation of the diffracted spectral components of interest. FIG. 9 shows an embodiment of an IC 100 of the present invention in which the optical path length is extended by the inclusion of a light guide formed by a first metal portion 910 and an opposite metal portion 920, which is laterally displaced with respect to the first metal portion 910. The metal portions are separated by a layer of a material that is at least partially transparent to the spectral compositions of interest of the incident light 150; for instance, the material may be $SiO_2$ for incident light 150 in the visible region.

The metal portions 910 and 920 act as mirrors for the diffracted spectral components 123-125. The metal portions 910 and 920 may be realized in the metal stack of the IC 100 using the aforementioned routine CMOS backend process steps. The metal portions 910 and 920 may be formed in lower metal layers of the metal interconnect stack than the metal portions of the diffractive elements 122. It will be understood that the light guide may comprise more than two metal portions.

The spectral resolution of the IC 100 of the present invention is further governed by the dimensions, i.e. the pitch, of the light-sensitive elements 112. The smaller the pitch of the light-sensitive elements 112, the higher the spectral resolution is due to the smaller spectral width of the light incident on a light-sensitive element 112. The minimum pitch is dictated by the feature sizes that can be realized by the lithography used in the IC manufacturing process.

FIG. 10 shows an aspect of another embodiment of an IC 100 of the present invention, in which the light-sensitive elements are placed in a grid 1000. The grid 1000 has m columns and n rows, with m and n positive integers, which may have different or the same values. Each light sensitive element in FIG. 10 is labeled by means of its row and column position, i.e. element $1^1$ is the element in the first column position of the first row of the grid 1000, and so on. In FIG. 10, the incident spectral components 123-125 are aligned with the y-axis of the grid 1000. As can be seen from FIG. 10, the grid elements parallel with this direction of incidence, i.e. the light-sensitive elements forming the column elements in the grid 1000, are oriented in a staggered fashion, such that the rows of the grid 1000 appear to be displaced with respect to each other. This has several advantages. For instance, two neighboring columns of the grid 1000 are no longer separated by a 'void' band, i.e. a strip of substrate devoid of light-sensitive elements, such that there no parts of the incident spectrum remain undetected. In other words, each diffracted spectral component is captured by at least one photo-sensitive element of the grid 1000 such that no parts of the diffracted spectrum remain undetected.

In addition, in a 'regular' grid having vertical (i.e. unstaggered) columns, each column element detects the same spectral width. Hence, the resolution of the light-sensitive elements in such a grid is governed by the spectral width, which in turn is governed by the pitch of the light-sensitive elements, as previously explained. In contrast, due to the fact that the light sensitive elements in a column of the grid 1000 are staggered, different light elements may detect a different spectral composition; for instance, light-sensitive element $n^2$ may detect a spectral band from 350-380 nm, whereas light-sensitive element $(n-1)^2$ may detect a spectral band from 360-390 nm due to the fact that the latter element is displaced with respect to the former element. Hence, the signals generated by the different light-sensitive elements of the grid 1000 may be extrapolated, e.g. by solving (subsets of) n*m linear equations, thus yielding a spectral resolution that is typically governed by the stagger step size rather than the pitch of the individual photo-sensitive elements. Hence, since the stagger step size is smaller than this pitch, the grid 1000 is capable of producing a higher spectral resolution due to the fact that the effective pitch of the photo-sensitive elements is reduced.

The IC 100 of the present invention may be integrated in an electronic device, e.g. as a spectrophotometer, an image sensor and so on. Such an electronic device may be a digital (video) camera, a mobile communications device comprising such a camera and so on.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An integrated circuit comprising:
   a substrate carrying a plurality of light-sensitive elements; and
   a blazed grating including
      a plurality of diffractive elements configured and arranged to diffract respective spectral components of incident light to respective light-sensitive elements, the plurality of diffractive elements including
         a vertical stack of layers that includes a stepped profile formed by
            a first layer having a first portion composed of a first material of a first refractive index and a second portion laterally offset from the first portion and composed of a second material of a different refractive index, and by
            a second layer below the first layer in the vertical stack of layers and having a third portion composed of the first material and a fourth portion, laterally offset from the third portion and composed of the second material,
         wherein the third portion laterally extends beyond the first portion.

2. The integrated circuit of claim 1, wherein the first material is composed of metal, and the second material is composed of a dielectric material at least partially transparent to the incident light, and wherein the third portion extends over the first portion.

3. The integrated circuit of claim 1, wherein the first layer and the second layer are separated by an insulating layer, and wherein the first portion and the third portion are connected through a via in the insulating layer.

4. The integrated circuit of claim 1, wherein a width of the first layer is a sum of a width of the first portion and a width of the second portion, wherein the ratio between a width of the second portion and a width of the first layer does not exceed 0.5.

5. The integrated circuit of claim 4, wherein said ratio is 1/3.

6. The integrated circuit of claim 1, wherein the first material includes copper metal.

7. The integrated circuit of claim 1, wherein the second material includes silicon oxide.

8. The integrated circuit of claim 1, further including a light guide optically coupled between the blazed grating and the plurality of light sensitive elements, the light guide including an at least partially transparent medium, a first metal portion on an upper surface of the at least partially transparent medium and a second metal portion on a lower surface of the at least partially transparent medium, the first metal portion being laterally displaced with respect to the second metal portion.

9. The integrated circuit of claim 1, wherein the plurality of light-sensitive elements are arranged in a two-dimensional grid on the substrate, wherein the light-sensitive elements parallel to diffraction patterns generated by the blazed grating are arranged in a staggered orientation.

10. An electronic device comprising the integrated circuit of claim 1.

11. A method of manufacturing an integrated circuit, comprising: providing a substrate carrying a plurality of light-sensitive elements; forming a first layer over the substrate, said first layer comprising an alternating pattern first portions having a first refractive index and further portions having a further refractive index; and forming a further layer over the first layer, said further layer comprising a further alternating pattern of said first portions and further portions, wherein a first portion in the further layer laterally extends beyond a first portion in the first layer, said first portion and further first portion forming a stepped profile of a diffractive element of a blazed grating.

12. The method of claim 11, wherein each of said layer forming steps comprises: depositing an insulating layer; depositing a masking layer over said insulating layer; patterning the masking layer; etching the insulating layer; removing the masking layer; depositing a metal over the etched insulating layer; and removing excess metal from the insulating layer.

13. The method of claim 11, wherein each of said layer forming steps comprises: depositing a metal layer; patterning said metal layer; depositing an insulating layer over the patterned metal layer; and planarizing said insulating layer.

14. The method of claim 11, further comprising depositing an intermediate layer between forming the first layer and forming the further layer.

15. The method of claim 14, further comprising: depositing a masking layer over the intermediate layer; patterning the masking layer to expose portions of the intermediate layer; etching the exposed portions of the intermediate layer, thereby forming trenches that extend through the intermediate layer; filling the trenches with a conductive material; and removing the patterned masking layer.

16. An integrated circuit comprising:
   a substrate carrying a plurality of light-sensitive elements; and
   a blazed grating including
      a plurality of diffractive elements configured and arranged to diffract respective spectral components of incident light to respective light-sensitive elements, the plurality of diffractive elements including
         a vertical stack of layers that includes a stepped profile formed by
            a first layer having a first portion composed of a first material of a first refractive index and a second portion laterally offset from the first portion and composed of a second material of a different refractive index,
            a second layer below the first layer in the vertical stack of layers and having a third portion composed of the first material and a fourth portion, laterally offset from the third portion and composed of the second material,
            an insulating layer separating the first layer and the second layer, and
            wherein the third portion laterally extends beyond the first portion, and the first portion is connected to the third portion through a via in the insulating layer.

17. The integrated circuit of claim 16, further including a light guide optically coupled between the blazed grating and the plurality of light sensitive elements, the light guide including a partially transparent layer, a first metal portion on an upper surface of the transparent layer and a second metal portion on a lower surface of the partially transparent layer, the first metal portion being laterally displaced with respect to the second metal portion.

18. The integrated circuit of claim 17, wherein the first metal portion and the second metal portion are mirrors that are configured and arranged to extend an optical pathway of the incident light to respective light-sensitive elements.

19. The integrated circuit of claim 16, wherein the plurality of light-sensitive elements are configured and arranged to convert the incident light to an electric current.

* * * * *